United States Patent [19]

Chung et al.

[11] Patent Number: 5,846,508

[45] Date of Patent: Dec. 8, 1998

[54] METHOD FOR PREPARING ALUMINUM NITRIDE POWDERS

[75] Inventors: Shyan-Lung Chung; Wen-Liang Yu, both of Tainan Hsien, Taiwan

[73] Assignee: National Science Council, Taipei, Taiwan

[21] Appl. No.: 853,576

[22] Filed: May 9, 1997

[51] Int. Cl.⁶ .................................................. C01B 21/072
[52] U.S. Cl. ............................................................ 423/412
[58] Field of Search ............................................. 423/412

[56] References Cited

U.S. PATENT DOCUMENTS 5,453,407  9/1995  Chung et al. ............................ 423/412
5,460,794  10/1995  Chung et al. ............................ 423/412
5,693,305  12/1997  Revankar et al. ....................... 423/412

*Primary Examiner*—Wayne Langel

[57] ABSTRACT

A method for preparing aluminium nitride includes a first step in which a mixture is formed of aluminium powder and ammonium halide powder. The mixture is then molded into a tablet, which is ignited in an airtight chamber containing nitrogen gas. Aluminium nitride is formed of the tablet through the combustion reaction of the tablet. The gas generated in the decomposition of the ammonium halide forms a number of channels in the tablet so as to enable nitrogen gas to enter the tablet to react with aluminium. The synthesis of aluminium nitride of high purity under low pressure is possible in view of the catalytic effect of the ammonium halide.

23 Claims, 2 Drawing Sheets

METHOD FOR PREPARING ALUMINUM NITRIDE POWDERS

FIELD OF THE INVENTION

The present invention relates generally to a method for preparing aluminium nitride (AlN), and more particularly to a combustion synthesis method for preparing the-powdery aluminium nitride.

BACKGROUND OF THE INVENTION

With its high thermal conductivity, a high electrical resistivity, good mechanical strength, and good oxidation and thermal-shock resistances, AlN becomes a very important ceramic material in industrial applications. It can be used for high-performance electronic substrate material, optical lenses, cutting tools, heat sinks, and many high-temperature structure materials.

The manufacturing methods for AlN include:

1) the gas phase reaction method, e.g.,

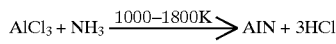

2) the direct nitridation method, e.g.,

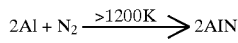

3) the reduction-nitridation method, e.g.,

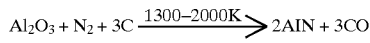

4) the combustion synthesis method.

The gas reaction method is not suitable for mass production of AlN in industry because of the high cost and low productivity involved.

The direct nitridation of Al and the nitridation of powdery $Al_2O_3$ methods require a process executed under a high temperature and a long period of time, e.g., 5 hours, to fully complete the reaction, which can thus result in common disadvantages including a greater energy consumption and a slow manufacturing rate.

In comparison to other methods, the combustion synthesis method is a new method used to synthesize ceramic materials by self-propagation combustion reactions. The advantages achieved thereby include those that it has a fast reaction rate, a less energy consumption and a simple manufacturing process and that it can be used for mass production. Several combustion synthesis examples were discussed in U.S. Pat. Nos. 5,453,407 and 5,460,794 which were issued to one of the present inventors and his co-workers and are owned by the same Assignee as the present invention of the present application.

SUMMARY OF THE INVENTION

The primary objective of the present invention is to provide an improved method for preparing aluminium nitride of excellent synthetic characteristics. The method employs a less number of reactants and excludes an igniting agent used in the prior art processes.

In keeping with the principle of the present invention, the foregoing objective of the present invention is attained by the method for preparing aluminium nitride, which comprises the following steps:

(a) mixing an aluminium powder and an ammonium halide powder;
(b) placing the mixture in a nitrogen atmosphere; and
(c) heating the mixture to bring about a self-combustion of the mixture.

The method of the present invention further comprises a step (d), in which the combustion product obtained in the step (c) is cooled before it is ground into powder.

Preferably, step (b) of the method of the present invention is carried out in an airtight chamber filled with nitrogen gas. In addition, the mixture is placed in the airtight chamber before the nitrogen gas is introduced into the airtight chamber. The airtight chamber may be a hermetic high-pressure reactor.

The mixture of the method of the present invention contains the aluminium powder and the ammonium halide such as $NH_4Cl$, $NH_4F$, $NH_4Br$, and $NH_4I$ in an appropriate ratio. The mixture may be molded into a cylindrical body under the pressure of 8–50 kg/cm$^2$, preferably 8–30 kg/cm$^2$. Alternatively, the mixture may be kept as a reactant in a pyrocontainer having an opening or a plurality of pores. The reactant will be referred to hereinafter as a reaction tablet hereinafter. When the process of making the reaction tablet is under way, an appropriate amount of aluminium nitride powder may be added. Said appropriate amount ranges from 1 to 30%, preferable about 10%, based on the weight of the aluminium powder and the ammonium halide powder.

The reaction tablet is then placed in a reaction chamber filled with nitrogen gas. One end of the reaction tablet is subsequently caused to bring about the combustion synthesis reaction by means of a laser or a resistance heating element capable of heating one end of the reaction tablet up to the temperature ranging between 1000° C. and 1600° C. This reaction is brought about in the presence of the nitrogen gas having pressure ranging between one and ten atmospheric pressures, preferably between one and six atmospheric pressures. The heating element includes tungsten filament or tape, and graphite filament or tape.

The method of the present invention differs from the prior art method in that the former makes use of the reaction tablet formed of aluminium powder and ammonium halide powder, and that the former employs a low nitrogen pressure under which the combustion of the reaction tablet is brought about.

Among ammonium halide, $NH_4Cl$ is most suitable for use in the method of the present invention. An appropriate ratio in relation to aluminium powder is in the range of 0.35–0.7:1 (in mole), preferably 0.5:1. The ammonium halide absorbs heat in its decomposition so as to slow down the melting of aluminium to maintain the porosity of the reaction tablet. In addition, a number of open channels are formed by the escape of gas which is formed in the decomposition of ammonium halide, thereby enabling the nitrogen gas to make contact with aluminium. Moreover, halogen produced in the decomposition has a catalytic effect in the nitridation reaction of aluminium in which the chemical reaction of aluminium and nitrogen is accelerated. For more details, please refer to I. A. Khan and T. R. Bhat, J. Less-Common Metals, 9, 388 (1965); A. P. Amosov, G. V. Bichurov, N. F. Bolshova, V. M. Erin, A. G. Makarenko and Y. M. Markov, Int. J. Self-Propagating Hugh-Temperature Synthesis, 1(2), 239 (1992).

In the process of making the reaction tablet, the melting of aluminium can be slowed down by an appropriate addition, such as 1–30 wt %, of a diluent like AlN which is capable of absorbing heat. In other words, the addition of the diluent helps maintain the porosity of the reaction tablet. In addition, the decrease in the combustion temperature can be attained by an addition of the diluent so as to bring about a change in the form of the product. However, the use of the diluent is suggested only if the diluent does not affect the reaction, and if the diluent does not cause the contamination of the product. For this reason, AlN is the most suitable diluent.

The pyrocontainer used in the method of the present invention is made of graphite or a ceramic material such as aluminium nitride, boron nitride, aluminium oxide, zirconium oxide, and the like.

DETAILED DESCRIPTION OF THE PREFERRED EMBODIMENTS

Figure 1:
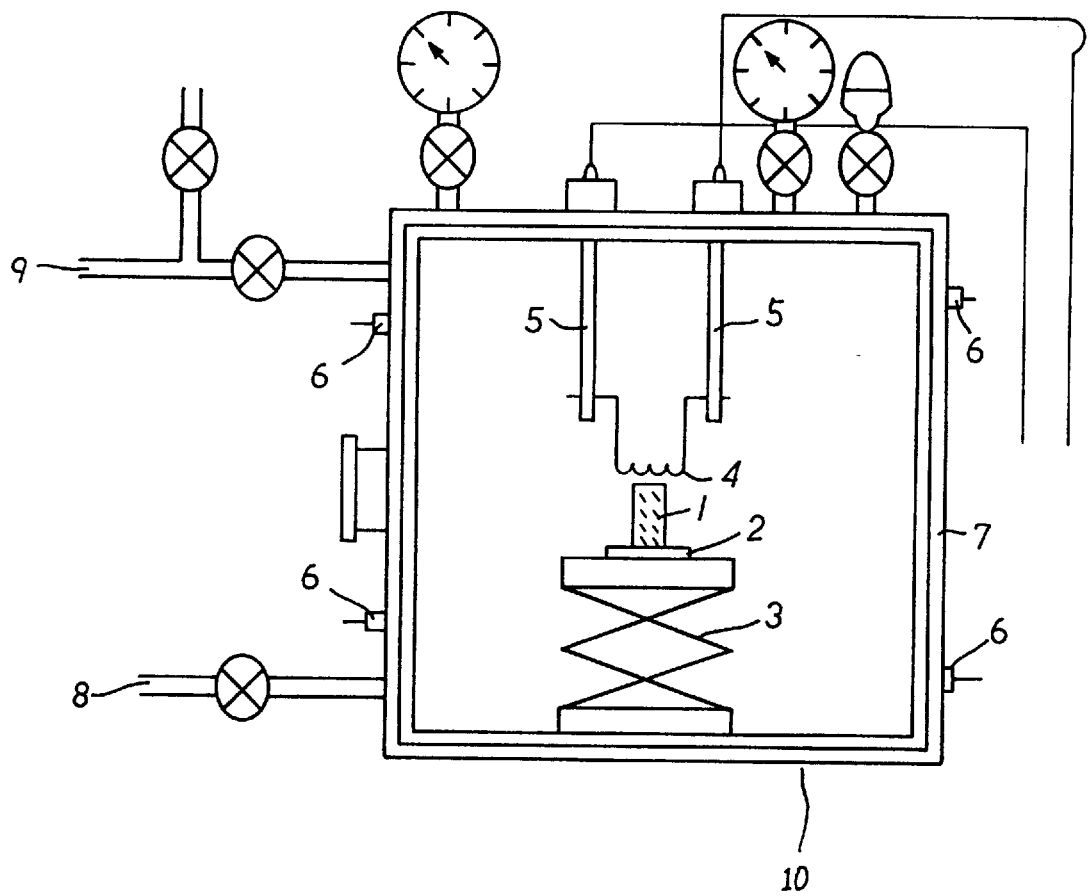
FIG. 1 shows a schematic view of a combustion synthesis reaction device suitable for use in the method of the present invention.

The embodiment of the present invention consists of a first step in which a mixture is formed of aluminium powder and ammonium halide powder in molar ratio of 1:0.35–0.7. The mixture is then molded into a reaction tablet having an appropriate form. The reaction tablet 1 is placed on a pyroplate 2 of a vacuum reactor 10, as illustrated in FIG. 1. An adjustable platform 3 is provided to facilitate the heating of the reaction tablet 1 such that the top of the reaction tablet 1 is separated from a heating wire 4 by a distance ranging between 5 and 6 mm. Thereafter, the vacuum reactor 10 is sealed off in an airtight manner. Electrodes 5 for heating and thermocouples 6 for measuring temperature are hermetically put through a wall 7 of the reactor 10 such that the electrodes 5 and the thermocouples 6 can be manipulated from the outside of the reactor 10.

The reactor 10 is then exhausted of air by means of an air exhausting system 8 so as to bring about a vacuum environment of $10^{-1}$ Torr inside the reactor 10. A nitrogen gas supply system 9 is used to introduce the nitrogen gas of high purity into the reactor 10 until the pressure of the nitrogen gas in the reactor 10 reaches 5 atmospheric pressures. As such processes of exhausting air and introducing nitrogen gas are carried out repeatedly, both air and moisture which are adhered to the surface of powder are effectively removed. Finally, the top of the reaction tablet 1 is heated by the heating wire 4 which is supplied with electric current of several amperes via the electrodes 5.

Figure 2:
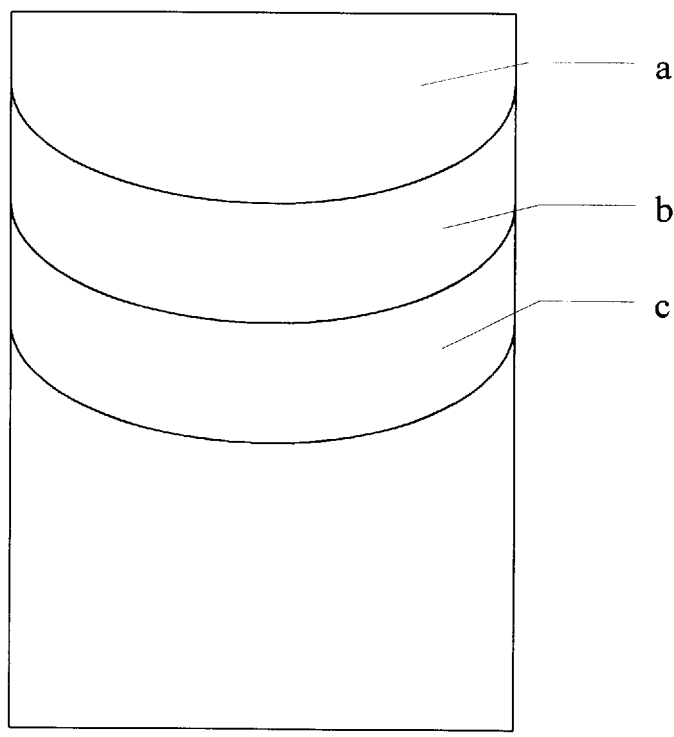
FIG. 2 shows a schematic view of heat propagation of the combustion synthesis reaction of the method of the present invention.

As illustrated in FIG. 2, the heat is transmitted downwards from the heated top of the reaction tablet 1, such as from the "a" portion to the "b" portion and then on to the "c" portion. In the course of such a heat transmission as described above, the gas produced by the decomposition of ammonium halide is allowed to escape so as to form a number of open gas channels to cause the inside of the reaction tablet to be full of the nitrogen-containing material formed by the decomposition and the nitrogen gas. The heating is continued until such time when the top of the reaction tablet begins to undergo the combustion synthesis reaction. As this reaction is completed, this reaction tablet I has substantially become a powder product of aluminium nitride, which is then cooled before the pressure is reduced to one atmospheric pressure. The reactor 10 is then opened to remove therefrom the product.

The conversion rate of AlN synthesized by the method of the present invention is rather high. The residual of aluminium can be removed by acid cleaning. The production rate is about 80%, which implies that 1.2 gram of AlN is synthesized from one gram of aluminium and that the remaining 0.2 gram of aluminium is either lost or not reacted. The nature and the quantity of the impurities contained in the product are dependent on the purity of aluminium powder and the purity of ammonium halide. The evaporation of the impurities is easily brought about by the combustion heat such that the impurities contained in the product are less than the reactant. The product is mostly granular in form and is fibrous in form to less extent. The product can be easily ground into powder particles having a size less than 1 $\mu$m.

The method of the present invention may be exemplified by the following chemical equation.

$$Al+NH_4Cl+\tfrac{1}{2}N_2 \rightarrow AlN+NH_3+HCl$$

The following embodiments are intended to illustrate the method of the present invention and are not to be used to restrict the scopes of the present invention.

EMBODIMENTS 1–4: Different Nitrogen Gas Pressures

A mixture was formed of aluminium powder and $NH_4Cl$ powder in a molar ratio of 1:0.5. The mixture was then molded, under the pressure of 10 Kg/cm$^2$, into a cylindrical body having a diameter of one centimeter and a height of 0.6 centimeter. The cylindrical body was then arranged in a vacuum reactor capable of withstanding high pressure. The vacuum reactor was first exhausted of air and was then filled with nitrogen gas. One end of the cylindrical body was ignited by a tungsten filament heating element for a period lasting between 45 seconds and 55 seconds. The reaction products so formed were white and powdery and were confirmed to be AlN by the XRD analysis. The reaction conditions and results are shown in the following Table 1.

TABLE 1

| Embodiments | Nitrogen pressure (atm) | Reaction time |
|---|---|---|
| 1 | 6 | about 45 seconds |
| 2* | 5 | about 45 seconds |
| 3 | 3 | about 50 seconds |
| 4 | 1 | about 55 seconds |

*a graphite heating tape was used in place of the tungsten filament heating element EMBODIMENT 5: Addition of Diluent A mixture was formed of aluminium powder and $NH_4Cl$ powder in a molar ratio of 1:0.5. A diluent of AlN powder corresponding in weight to 10% of the mixture was added to the mixture to form a cylindrical body under the molding pressure of 10 kg/cm$^2$. The cylindrical body has a diameter of one centimeter and a height of 0.6 centimeter. The cylindrical body was placed in a vacuum reactor filled with nitrogen gas having a pressure of 9 atms. One end of the cylindrical body was ignited with a tungsten filament heating element for about 45 seconds. The reaction product so formed was white and powdery and was confirmed to be AlN by the XRD analysis.

EMBODIMENTS 6–11: Different Mixing Ratios and Molding Pressures

Various mixtures were formed by mixing aluminium powder and $NH_4Cl$ powder in various molar ratios. The mixtures were molded under various molding pressures (8–15 kg/cm$^2$) into a cylindrical body having a diameter of one centimeter and a height of 0.6 centimeter. The cylindrical body was placed in a vacuum reactor in which one end of the cylindrical body was ignited in presence of nitrogen gas (3 atm) by a tungsten filament heating element for a period lasting about 50 seconds. The reaction products were white and powdery and were confirmed to be AlN by the XRD analysis. The results are shown in the following Table 2.

TABLE 2

| Embodiments | Al:NH$_4$Cl ratio | Molding pressure (kg/cm$^2$) |
| --- | --- | --- |
| 6* | 1:0.6 | 10 |
| 7 | 1:0.55 | 10 |
| 8 | 1:0.45 | 10 |
| 9 | 1:0.4 | 8 |
| 10 | 1:0.5 | 12 |
| 11 | 1:0.5 | 15 |

*a graphite heating tape was used in place of the tungsten filament heating element EMBODIMENTS 12–14: Cylindrical Bodies of Various Sizes The aluminium powder and the NH$_4$Cl powder were mixed to form mixtures in a molar ratio of 1:0.5. The mixture was molded under the pressure of 30 kg/cm$^2$ to form cylindrical bodies of various sizes. The cylindrical bodies were placed respectively in a vacuum reactor filled with the nitrogen gas (3 atm). One end of the cylindrical bodies was caused to burn by a tungsten filament heating element for a period lasting between 50 seconds and 60 seconds. The reaction products were white and powdery and were confirmed to be AlN by the XRD analysis. The results are shown in the following Table 3.

TABLE 3

| Embodiment | Sizes of cylindrical bodies (diameter × height) in centimeter |
| --- | --- |
| 12 | 1 × 0.9 |
| 13 | 1.7 × 0.6 |
| 14 | 1.7 × 1.0 |

EMBODIMENTS 15–17: Different Ammonium Halide

An aluminium powder and an ammonium halide powder were mixed to form a mixture in a molar ratio of 1:0.5. The mixture was molded under the pressure of 30 kg/cm$^2$ to form a cylindrical body having a diameter of one centimeter and a height of 0.6 centimeter. The cylindrical body was heated in a vacuum reactor containing nitrogen gas (6 atm) for a period ranging between 50 and 60 seconds by means of a tungsten filament heating element such that one end of the cylindrical body was ignited and that the combustion propagated through the whole cylindrical body. The reaction products so formed were white and powdery and were confirmed to be AlN by the XRD analysis. The results are shown in the following Table 4.

TABLE 4

| Embodiments | Ammonium halide |
| --- | --- |
| 15 | NH$_4$F |
| 16 | NH$_4$Br |
| 17 | NH$_4$I |

EMBODIMENT 18: Use of Container Resistant to High Temperature and Having an Opening A mixture was formed of aluminium powder and NH$_4$Cl powder in a molar ratio of 1:0.5. The mixture was placed in an aluminium nitride crucible before being placed in a vacuum reactor containing nitrogen gas (6 atm). The reaction mixture was ignited by a tungsten filament heating element for about 100 seconds. The reaction product was white and powdery and was confirmed to be AlN by the XRD analysis.

EMBODIMENT 19: Use of a Porous Container Resistant to High Temperature

A mixture was formed of aluminium powder and NH$_4$Cl powder in a molar ratio of 1:0.5. The mixture was then placed in a porous crucible of graphite before being placed in a vacuum reactor containing nitrogen gas (6 atm). The reaction mixture was ignited by a tungsten filament heating element for about 90 seconds. The reaction product was white and powdery and was confirmed to be AlN by the XRD analysis.

What is claimed is:

1. A method for preparing aluminum nitride, said method comprising the steps of:
   (a) mixing an aluminum powder, an ammonium halide powder, and an aluminum nitride-compatible diluent, and forming said mixture into a densely confined structure without any catalyst;
   (b) placing the mixture having the confined structure in an atmosphere of nitrogen gas; and
   (c) heating the mixture until a self-combustion of the mixture is brought about.

2. The method as defined in claim 1, wherein said aluminium powder and said ammonium halide are mixed in a molar ratio ranging between 1:0.35 and 1:0.7.

3. The method as defined in claim 2, wherein said aluminium powder and said ammonium halide are mixed in a molar ratio of 1:0.5.

4. The method of claim 1, wherein said aluminum nitride-compatible diluent is an aluminum nitride powder.

5. The method of claim 4, wherein 1–30% of said aluminum nitride powder is mixed, based on the weight of said aluminum powder and said ammonium halide powder.

6. The method as defined in claim 5, wherein 10% of said aluminium nitride powder is mixed, based on the weight of said aluminium powder and said ammonium halide powder.

7. The method as defined in claim 1, wherein said mixture of the step (b) is molded into a tablet.

8. The method as defined in claim 1, wherein said mixture of the step (b) is contained in a vessel resistant to elevated temperature and having an opening.

9. The method as defined in claim 1, wherein said mixture of the step (b) is contained in a porous vessel resistant to elevated temperature.

10. The method as defined in claim 1, wherein said ammonium halide powder is NH$_4$F, NH$_4$Cl, NH$_4$Br, or NH$_4$I.

11. The method as defined in claim 10, wherein said ammonium halide powder is NH$_4$Cl.

12. The method as defined in claim 7, wherein said tablet is formed under a pressure ranging between 8 and 50 kg/cm$^2$.

13. The method as defined in claim 7, wherein said tablet is formed under a pressure ranging between 8 and 30 kg/cm$^2$.

14. The method as defined in claim 7, wherein said tablet has a cylindrical form.

15. The method as defined in claim 8, wherein said vessel is made of a graphite material or a ceramic material of aluminum nitride, boron nitride, or aluminum oxide.

16. The method as defined in claim 9, wherein said vessel is made of a graphite material or a ceramic material of alumimum nitride, boron nitride, or aluminum oxide.

17. The method as defined in claim 1, wherein said heating referred to in step (c) is attained by a resistance heating element of tungsten filament, tungsten tape, graphite filament, or graphite tape.

18. The method as defined in claim 1, wherein said heating of step (c) is attained by laser.

19. The method as defined in claim 1 further comprising a step (d) in which a combustion product formed in step (c) is cooled and then ground into powder.

20. The method as defined in claim 1, wherein the atmosphere of nitrogen gas referred to in step (b) is formed by an airtight chamber which is first exhausted of air and is then filled with nitrogen gas; and wherein said mixture is prearranged in the airtight chamber.

21. The method as defined in claim 20, wherein said airtight chamber is a reactor capable of being sealed off and resistant to elevated pressure.

22. The method as defined in claim 20, wherein the nitrogen gas contained in the airtight chamber has a pressure ranging between 1 and 10 atmospheric pressures.

23. The method as defined in claim 22, wherein the nitrogen gas contained in the airtight chamber has a pressure ranging between 1 and 6 atmospheric pressures.

* * * * *